United States Patent [19]
Holowczak et al.

[11] Patent Number: 5,623,988
[45] Date of Patent: Apr. 29, 1997

[54] POLYMERIC HEAT EXCHANGER WITH CERAMIC MATERIAL INSERT

[75] Inventors: John E. Holowczak, South Windsor, Conn.; Walter J. Fallows, Windsor, Mass.

[73] Assignee: Gas Research Institute, Chicago, Ill.

[21] Appl. No.: 533,107

[22] Filed: Sep. 25, 1995

[51] Int. Cl.$^6$ ..................................... F28F 19/00
[52] U.S. Cl. ................. 165/134.1; 165/135; 165/170; 126/99 R
[58] Field of Search ............... 126/99 R, 110 R, 126/116 R; 165/135, 170, 177, 178, 134.1

[56] References Cited

U.S. PATENT DOCUMENTS

| | | | |
|---|---|---|---|
| 3,489,209 | 1/1970 | Johnson | 165/133 |
| 3,923,314 | 12/1975 | Lawler et al. | 277/112 |
| 4,122,894 | 10/1978 | Laws et al. | 165/76 |
| 4,193,180 | 3/1980 | Press | 29/157.4 |
| 4,323,115 | 4/1982 | Stafford et al. | 165/79 |
| 4,437,217 | 3/1984 | Lallaye et al. | 29/157.4 |
| 4,582,126 | 4/1986 | Corey | 165/82 |
| 4,653,575 | 3/1987 | Courchesne | 165/54 |
| 4,735,261 | 4/1988 | Huebner | 165/76 |
| 4,738,307 | 4/1988 | Bentley | 165/133 |
| 4,768,586 | 9/1988 | Berneburg et al. | 165/163 |
| 4,787,443 | 11/1988 | Fukatsu et al. | 165/165 |
| 4,790,372 | 12/1988 | Gemeinhardt et al. | 165/173 |
| 4,859,265 | 8/1989 | Shuster et al. | 156/292 |
| 4,947,931 | 8/1990 | Vitacco | 165/148 |
| 4,955,435 | 9/1990 | Shuster et al. | 165/170 |
| 4,982,785 | 1/1991 | Tomlinson | 165/170 |
| 5,178,124 | 1/1993 | Lu et al. | 126/110 R |
| 5,238,057 | 8/1993 | Schelter et al. | 165/158 |

*Primary Examiner*—Allen J. Flanigan
*Attorney, Agent, or Firm*—Thomas, Kayden, Horstemeyer & Risley

[57] ABSTRACT

A heat exchanger for use as a condensing heat exchanger in a gas-fired hot air furnace has a ceramic pipe forming an initial portion of a fluid flow path through the heat exchanger. The ceramic pipe receives the combustion gases from a primary heat exchanger and reduces the temperature of the combustion gases to below a certain temperature. A polymer-based structure is connected to the ceramic pipe and forms the remaining portion of the fluid flow path through the heat exchanger. The geometry and orientation of the ceramic pipe is selected so that the certain temperature of the combustion gases exiting the ceramic pipe is less than the softening temperature of the polymer-based structure. The resultant heat exchanger combines the high temperature and corrosion resistance of ceramic materials with the low cost and high corrosion resistance of polymer materials. As a result, a low cost heat exchanger can be produced which can withstand both the high temperatures of the combustion gases as well as the corrosive properties of the condensates from the combustion gases.

25 Claims, 4 Drawing Sheets

FIG. 5 on the page

POLYMERIC HEAT EXCHANGER WITH CERAMIC MATERIAL INSERT

BACKGROUND OF THE INVENTION

1. Field of the Invention

The present invention generally relates to a heat exchanger and, more particularly, to a heat exchanger for use with high temperature materials.

2. Description of the Prior Art

In a typical propane or gas-fired hot air furnace, burner assemblies within the furnace inject a mixture of fuel and air into the inlets of a respective number of primary heat exchanger assemblies. After the fuel air mixture is combusted within the primary heat exchangers, the combustion gas travels through a serpentine flow path within the primary heat exchanger assemblies, exchanging some of the heat produced to the room air.

The more efficient gas-fired hot air furnaces increase the amount of heat energy transferred from the flue gas to the air to be heated. One manner in which the efficiency of the gas-fired hot air furnaces is being raised is by cooling the flue gases while still within the furnace to below their dew point. By cooling the flue gases to the point where condensation occurs, the latent heat of evaporation may be recovered as usable energy.

The recovery of the latent heat of evaporation is typically accomplished by adding a condensing heat exchanger to the primary heat exchanger and by passing air to be heated over the condensing heat exchanger and then through the primary heat exchanger. Some typical heat exchangers have been constructed from two engineering metal sheets such that a fluid flow is created when the two sheets are stamped and assembled.

As with the primary heat exchanger, the condensing heat exchanger must be constructed from a material having good heat transfer, adequate strength, minimum material thickness and preferably low manufacturing costs. The condensing heat exchanger, however, must additionally be constructed from a material having a high resistance to chemical attack. When the combustion gases condense within the condensing heat exchangers, a variety of acids may be produced, including carbonic and nitric acids, which can severely corrode bare steel and pit aluminum and copper with concentrations as little as 10 ppm (parts per million). As should be apparent, a condensing heat exchanger must be carefully designed for the environment within which the exchanger is placed.

Many condensing heat exchangers have been constructed from such materials as 300 Series stainless steel, which is a rather expensive material. Some less expensive engineering materials have been used with coatings that have been applied from a liquid or powder state. These coated engineering materials, however, have performed very poorly when used as a condensing heat exchanger since the coatings blister, crack, and fall off during the forming process of the condensing heat exchanger or while in service, thereby causing localized corrosion of the steel substrate.

An improved condensing heat exchanger is disclosed in U.S. Pat. No. 4,738,307 to Bentley, the disclosure of which is hereby incorporated by reference. The condensing heat exchanger in Bentley is formed from a single sheet of metal stamped to have an inlet, an outlet, and a flow passage between the inlet and outlet. The stamped sheet is laminated with a corrosion resistant material, preferably polypropylene, is folded at a center line, and then tabs on the sides of the exchanger are folded over and crimped to form the completed condensing heat exchanger. Because the single sheet is folded, one edge of the condensing heat exchanger is seamless, thereby reducing the risk of condensate leakage from the condensing heat exchanger.

While the condensing heat exchanger of the type disclosed in Bentley is less expensive than one constructed from Series 300 stainless steel, the condensing heat exchanger is still rather expensive. The use of polymer coated steel in Bentley's condensing heat exchanger is more expensive than many other types of materials, such as many plastics. The process for constructing Bentley's condensing heat exchanger is also lengthy since it involves a multi-step process including the steps of stamping, laminating, folding the two halves of the sheet, folding the tabs, and crimping the tabs.

With some heat exchangers in general, the heat exchangers have been constructed from polymers rather than stainless steel. For instance, U.S. Pat. No. 4,790,372 to Gemeinhardt et al. and U.S. Pat. No. 4,947,931 to Vitacco both disclose heat exchangers having passages formed from a thermoplastic or nylon polymer. If these heat exchangers were used as a condensing heat exchanger in a gas-fired hot air furnace, the heat exchangers would have to be constructed from a high temperature polymer material, which is rather expensive, in order to withstand the high inlet temperatures of the combustion gases. Thus, although a plastic material has a high corrosion resistance, a condensing heat exchanger constructed from a high temperature resistant polymer alone would not offer any cost savings.

A polymer heat exchanger, which would likely have a metallic header, would have other disadvantages as well. For instance, many furnaces have a variable speed room side blower. At low heating loads, special thermostats control the fan speed and burner firing rate so that they are at a reduced level, thereby increasing energy efficiency and comfort for the occupants by reducing the amount of noise through the ductwork. At these low heating loads, the condensation point of the combustion products is moved closer to the entrance of the secondary heat exchanger. This shift in location of the condensation point could expose the metallic header to the corrosive acids which are capable of rapidly degrading mild steel. The location of the condensation point can also shift in a non-variable speed condensing furnace, such as when the room air is below normal temperature. Thus, a need exists for a secondary heat exchangers which can accommodate location changes in the condensation point.

Another problem of a polymer exchanger having a metallic header relates to multi-poise operation. It is desirable in the home heating industry to produce furnaces which can be installed in a wide variety of orientations, such as horizontal right, horizontal left, vertical up, and vertical down, also known as multi-poise. A heat exchanger that can operate in the wide variety of orientations reduces the need to manufacture and stock furnaces designed for only one orientation. A secondary condensing heat exchanger, however, must accommodate for the flow of condensates through the heat exchanger and to a drain. Due to variations in orientation as well as other variations in the operation of a furnace, the condensates may likely flow down into the metallic header portion of the exchanger thereby degrading the header.

Other types of heat exchangers have been constructed from ceramic materials, such as glass. For instance, U.S. Pat. No. 4,653,575 to Courchesne describes an air-to-air heat exchanger comprised of a plurality of glass tubes through which the heated air travels. The ceramic materials, such as glass, are desirable since they can withstand generally higher temperatures than many plastic materials. For instance, U.S. Pat. No. 4,768,586 to Berneburg et al. discloses a ceramic heat exchanger which has a better heat resistance and corrosion resistance than most metallic exchangers. The ceramic materials, however, are more fragile and brittle and more easily crack or break during shipping, installation, or operation. Consequently, ceramic materials are not commonly used in many heat exchangers.

Therefore, it is still generally a problem in the art to provide a low cost heat exchanger which has a good heat transfer, adequate strength, and minimum overall system cost. It is further a problem in the art to provide a low cost condensing heat exchanger which can withstand both the high temperatures of the combustion gases and the corrosive acids within a gas-fired hot air condensing furnace.

SUMMARY OF THE INVENTION

An object of the present invention is to provide a low cost heat exchanger.

Another object of the present invention is to provide a heat exchanger which can be used in corrosive environments.

Another object of the present invention is to provide a heat exchanger which can be used with high temperatures.

Another object of the present invention is to provide a heat exchanger which can safely be used in variable speed operation.

Another object of the present invention is to allow a condensing heat exchanger to operate safely in a plurality of orientations.

Additional objects, advantages, and novel features of the invention will be set forth in the description which follows, and will become apparent to those skilled in the are upon reading this description or practicing the invention.

To achieve the foregoing and other objects, a novel heat exchanger comprises a length of ceramic pipe having a first end forming an inlet to the heat exchanger and a second end opposite the first end. The ceramic pipe forms an initial portion of a fluid flow path through the heat exchanger. A polymer-based structure is connected to the second end of the ceramic pipe and forms the remaining portion of the fluid flow path through the heat exchanger. The geometry of the ceramic pipe is chosen so that the fluid flowing through the ceramic pipe is reduced from a first temperature at the first end of the ceramic pipe to a second temperature at the second end of the ceramic pipe near the polymer-based structure with the second temperature being less than a softening temperature of the polymer-based structure.

By using a ceramic material at the entrance to the heat exchanger, the temperature of the fluid may be reduced below the softening temperature of the polymer-based structure. As a result of the reduced temperature at the inlet to the polymer-based structure, the polymer-based structure may be formed from a lower cost polymer. The ceramic pipe is placed at the entrance to the heat exchanger because of its high temperature resistance and the polymer-based structure forms the remaining portion of the heat exchanger because of its high corrosion resistance and its lower cost.

In another aspect, the invention relates to a method of forming a heat exchanger comprising the steps of forming a ceramic pipe to have a certain length and to define an initial portion of a fluid flow path through the heat exchanger. A polymer-based structure is formed to define a remaining portion of the fluid flow path through the heat exchanger. The geometry of the ceramic pipe is selected so that a fluid flowing through the ceramic pipe is reduced from a first temperature at the inlet end of the ceramic pipe to a second temperature at the outlet end of the ceramic pipe near the polymer-based structure with the second temperature being less than a softening temperature of the polymer-based structure.

In yet a further aspect of the invention, a method for exchanging heat by using a heat exchanger comprises the steps of passing a heated fluid through a ceramic pipe having a certain geometry with the ceramic pipe defining an initial portion of a fluid flow path through the heat exchanger. After passing through the ceramic pipe, the fluid is routed to a polymer-based structure and is passed through the polymer-based structure, which defines a remaining portion of the fluid flow path through the heat exchanger. As the fluid is passed through the ceramic pipe, the fluid is cooled from a first temperature at an inlet to the ceramic pipe to a second temperature at the outlet of the ceramic pipe with the second temperature being below a softening temperature of the polymer-based structure.

BRIEF DESCRIPTION OF THE DRAWINGS

The accompanying drawings, which are incorporated in, and form a part of, the specification, illustrate certain preferred embodiments of the present invention and, together with the description, serve to explain the principles of the invention. The drawings are not necessarily to scale, emphasis instead being placed upon clearly illustrating the principles of the invention. In the drawings.

DETAILED DESCRIPTION OF THE PREFERRED EMBODIMENT

Figure 1:
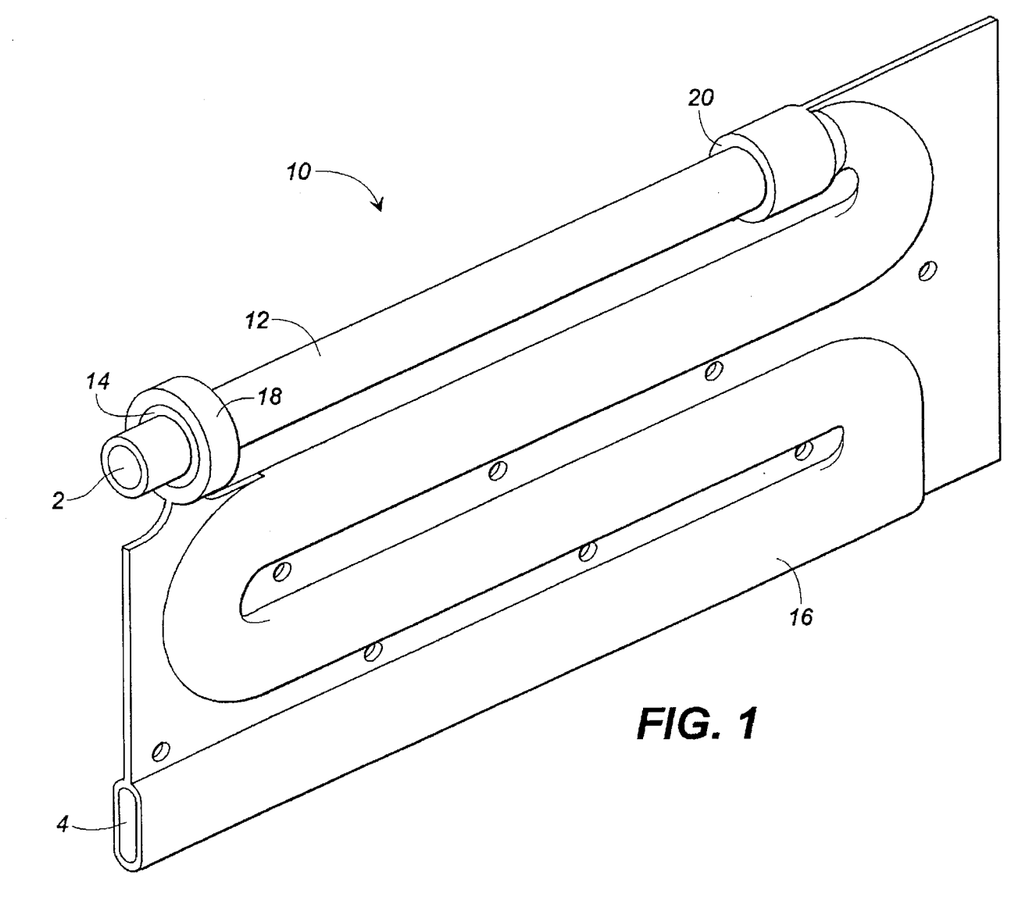
FIG. 1 is a perspective side view of a condensing heat exchanger according to a first embodiment of the invention.
Figure 2:
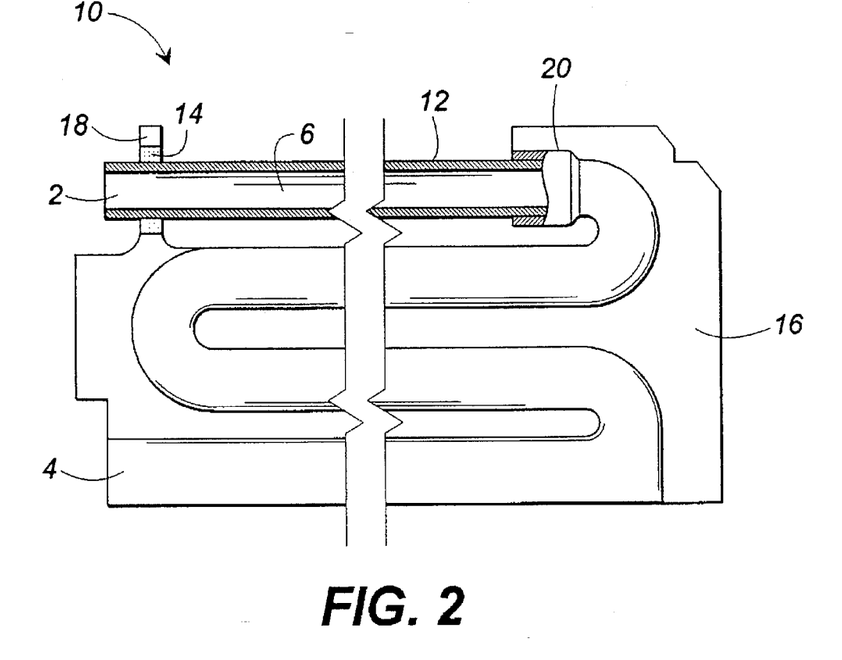
FIG. 2 is a cross-sectional side view of the condensing heat exchanger in FIG. 1.

Reference will now be made in detail to the preferred embodiments of the invention. With reference to FIGS. 1 and 2, a heat exchanger 10 according to a preferred embodiment of the invention comprises a condensing heat exchanger 10 for use in a gas-fired hot air furnace. It should be understood that the principles of the invention may be applied to heat exchangers other than a condensing heat exchanger and may be used in environments other than in a gas-fired hot air furnace.

The condensing heat exchanger 10 has a condensing heat exchanger inlet 2 and a condensing heat exchanger outlet 4. Although not shown, the inlet 2 opens into a box that couples the primary heat exchanger to the condensing heat exchanger and the outlet 4 opens into a condensate collector. The condensing heat exchanger 10 has an internal fluid flow path 6 which winds downwardly from the inlet 2 to the outlet 4. The fluid flow path 6 is essentially the same as the fluid flow path of the condensing heat exchanger disclosed in U.S. Pat. No. 4,738,307 to Bentley, the disclosure of which has been incorporated by reference.

The condensing heat exchanger 10 is comprised of a ceramic piece of pipe 12 forming the inlet 2 to the condensing heat exchanger 10 and an initial portion of the fluid flow path 6 and a plastic structure 16 which defines the rest of the fluid flow path 6 as well as the outlet 4 for the condensing heat exchanger 10. An insulating wrap 14 is formed near the inlet 2 to the condensing heat exchanger 10 and is placed between the ceramic pipe 12 and the plastic structure 16. A portion 18 of the plastic structure 16 supports and is mounted to the inlet end of the ceramic pipe 12 while a portion 20 of the plastic structure 16 supports and is mounted to the opposite end of the ceramic pipe 12.

In operation, the gas exiting the primary heat exchanger and entering the condensing heat exchanger 10 at the inlet 2 is at a high temperature in the range of 300° to 450° F. The pipe 12, being formed from a ceramic material, has a high temperature resistance and reduces the temperature of the combustion gas as it travels through the ceramic pipe 12 transferring the heat to the room air. By the time the combustion gas reaches the portion of the fluid flow path 6 formed by the plastic structure 16, the temperature of the combustion gas has been reduced below the softening temperature of the plastic structure 16. In general, the softening temperature is the temperature at which the polymer in the structure 16 loses or has a significant drop in its elastic modulus such that the polymer is no longer structurally sound. Thus, by reducing the temperature below the softening temperature, the heated gas will not melt, deform, or degrade the plastic structure 16.

After the combustion gas enters the plastic structure 16, the gas continues to lose heat and products of the combustion begin to condense. The structure 16, being formed from a polymer, has a high corrosion resistance and can effectively and safely route the condensate to the condensate collector. The portion 18 of the plastic structure 16 is insulated from the ceramic pipe 12 by the wrap 14 whereby the temperature of the portion 18 is maintained below the softening temperature of the portion 18. The insulating wrap 14 may be comprised from many suitable insulating materials, such as Fiberfrax™ manufactured by Carborundum Co., Saffil™ by DuPont, or, preferably, Interam™ by 3M.

The condensing heat exchanger 10 can be safely used with variable speed and multi-poise operation. In addition to having a high temperature resistance, the ceramic pipe 12 also has an excellent resistance to corrosive acids. Thus, during variable speed or multi-poise operation, condensates may flow into the ceramic pipe 12 without degrading the ceramic material forming the pipe 12.

The pipe 12 may be formed from a number of ceramic or ceramic/glass types of materials. These materials include, but are not limited to, magnesium silicate, magnesium aluminum silicate, siliconized silicon carbide, sintered silicon carbide, silicon, silicon nitride, aluminum oxide, cordierite, zirconium oxide/aluminum oxide or mixtures thereof. A ceramic material which is preferred due to its low cost and its high temperature characteristics is a crystalline aluminosilicate, such as mullite.™ The formation of a ceramic pipe 12 is known to one skilled in the art and, accordingly, will not be described in any detail.

The plastic structure 16 may also be formed from a number of different types of polymers and is preferably formed from a low cost polymer, such as polypropylene, polyethylene, or styrene. The plastic structure 16 may additionally comprise one or more additives, such as a flame retardant. The plastic structure 16, however, need not be formed from a low cost polymer but could instead be formed from higher cost polymers, such as polyphenylene sulfide (PPS) or liquid crystal polymers, or middle cost polymers, such as polycarbonate or polyphenylene oxide-based materials. As will be apparent to those skilled in the art upon reading this description, any type of polymer which is resistant to corrosion from the condensate may be used in forming the structure 16 and additional examples of polymers include PPA, polyimide, PBT, or PET.

Figure 3:
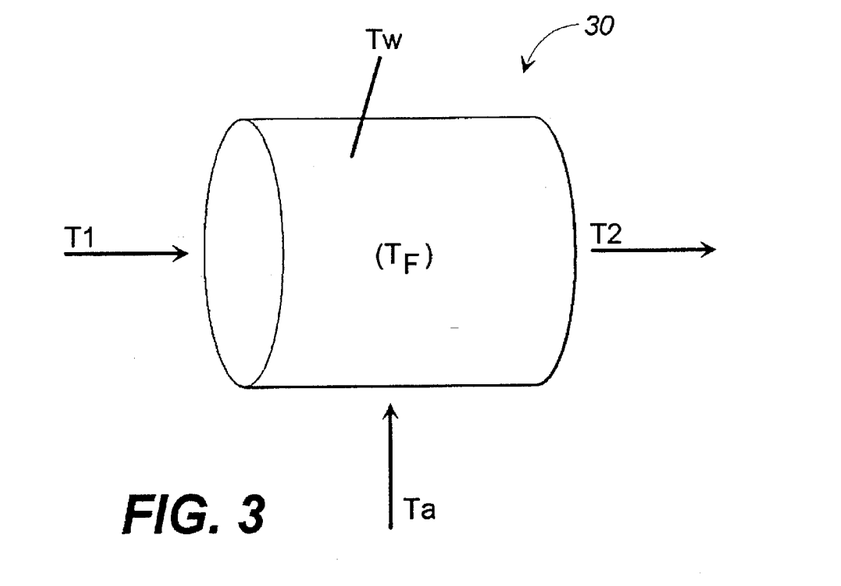
FIG. 3 is a diagram of an element of a heat exchanger.

The type of polymer material that may be used in forming the plastic structure 16 is, in part, dictated by the temperature of the combustion gas entering the ceramic pipe 12, the heat transfer capability of the ceramic pipe 12, and the surface area of the ceramic pipe 12. In general, an element 30 of a heat exchanger is shown in FIG. 3 as having hot flue gas enter at temperature $T_1$ and exit at temperature $T_2$. The average flue gas temperature $T_F$ can be determined as follows:

$$T_F=(T_1+T_2)/2 \qquad \text{(EQ. 1)}.$$

The element 30 has a length L, a diameter D, and thus has a surface area A equal to $\pi DL$. In the figure, $T_A$ is the constant free stream of air temperature, $T_W$ is the bulk internal fluid temperature, and $T_w$ is the temperature of the wall of the element 30. The conduction of heat through the wall of the heat exchanger element 30 is much greater than the convection of heat through the flue side and the convection of heat on the air side. The heat transfer process can therefore be simplified based upon the convection of heat on the flue and air sides of the heat exchanger element 30.

The heat transfer from the hot flue gas is given by:

$$q=mc_p(T_1T_2) \qquad \text{(EQ. 2)},$$

where m is the mass flow rate and $c_p$ is the specific heat.

The heat transfer from the hoe flue gas can also be expressed as follows:

$$q=A(T_F-T_A)/(1/h_i+1/h_o) \qquad \text{(EQ. 3)},$$

where $h_i$ and $h_o$ are the heat transfer coefficients at the inside and outside of the heat exchanger element 30.

By simultaneously solving the above three equations by well known numerical techniques, the three unknowns of the fluid temperature $T_F$, the temperature $T_2$, and the heat transfer q can be determined. Consequently, by proper selection of the length, diameter, and material of the ceramic pipe, it is possible to reduce the temperature at the outlet of the ceramic pipe 12 below the softening temperature of a particular polymer forming the structure 16. For instance, if the structure 16 is formed with polypropylene, then the ceramic pipe 12 must reduce the temperature of the combustion gas to below 300° F., which is the softening temperature of polypropylene.

The formation of the plastic structure 16 will be apparent to one skilled in the art and may be formed by any suitable process. For instance, the plastic structure 16 may be injected molded into two halves with the two halves being joined together to form the complete structure 16. The two halves of the structure 16 may be joined together in a number of ways, such as by vibration welding or by using a room temperature vulcanizing silicon rubber adhesive, commonly known as "furnace paste." The structure 16 could alternatively be formed in a single assembly by blow molding or by soluble-core or lost-core molding. Even though blow molding and soluble-core molding are generally more expensive methods than injection molding, the blow molding and soluble-core molding processes may be preferred over injection molding because they do not produce any seams that might fail and because they do not require an additional assembly process. Other variations in the formation process, such as flow forming or compression molding of a thermoset material, will become apparent to those skilled in the art.

In the embodiments shown, the plastic structure 16 is formed to have portions 18 and 20 surrounding the two ends of the ceramic pipe 12. The two portions 18 and 20 may be formed around the ceramic pipe 12 simultaneously with the formation of the entire structure 16, for instance by injection molding the portions 18 and 20 around the ceramic pipe 12. The portion 20 of the structure 16 would support the ceramic pipe 12 as well as seal the ceramic pipe 12 to the structure 16. The portion 18 of the structure 16 would support the inlet end of the ceramic pipe 12 and, together with the insulating wrap 14, would protect the ceramic pipe 12 from damage during shipping or installation.

Figure 4:
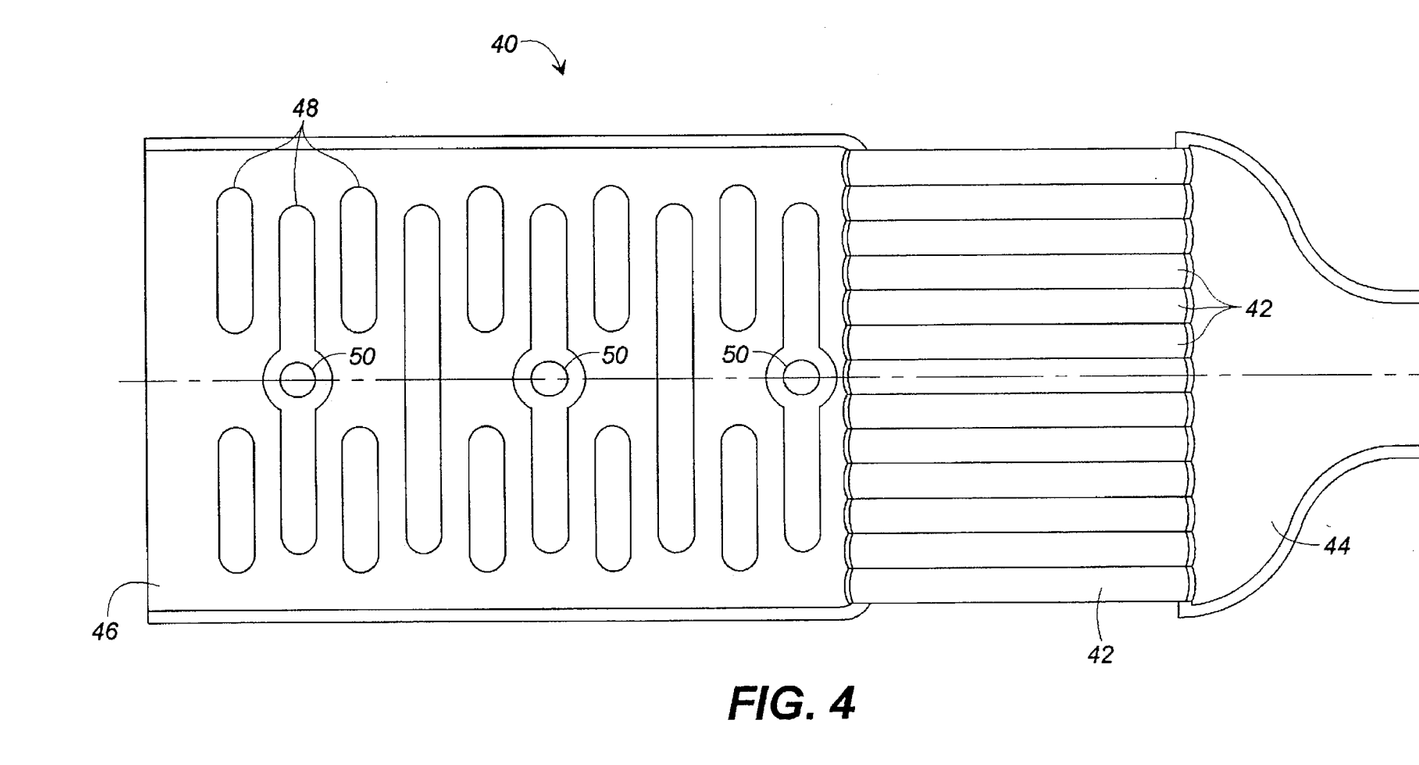
FIG. 4 is a top plan view of a condensing heat exchanger according to a second embodiment of the invention.
Figure 5:
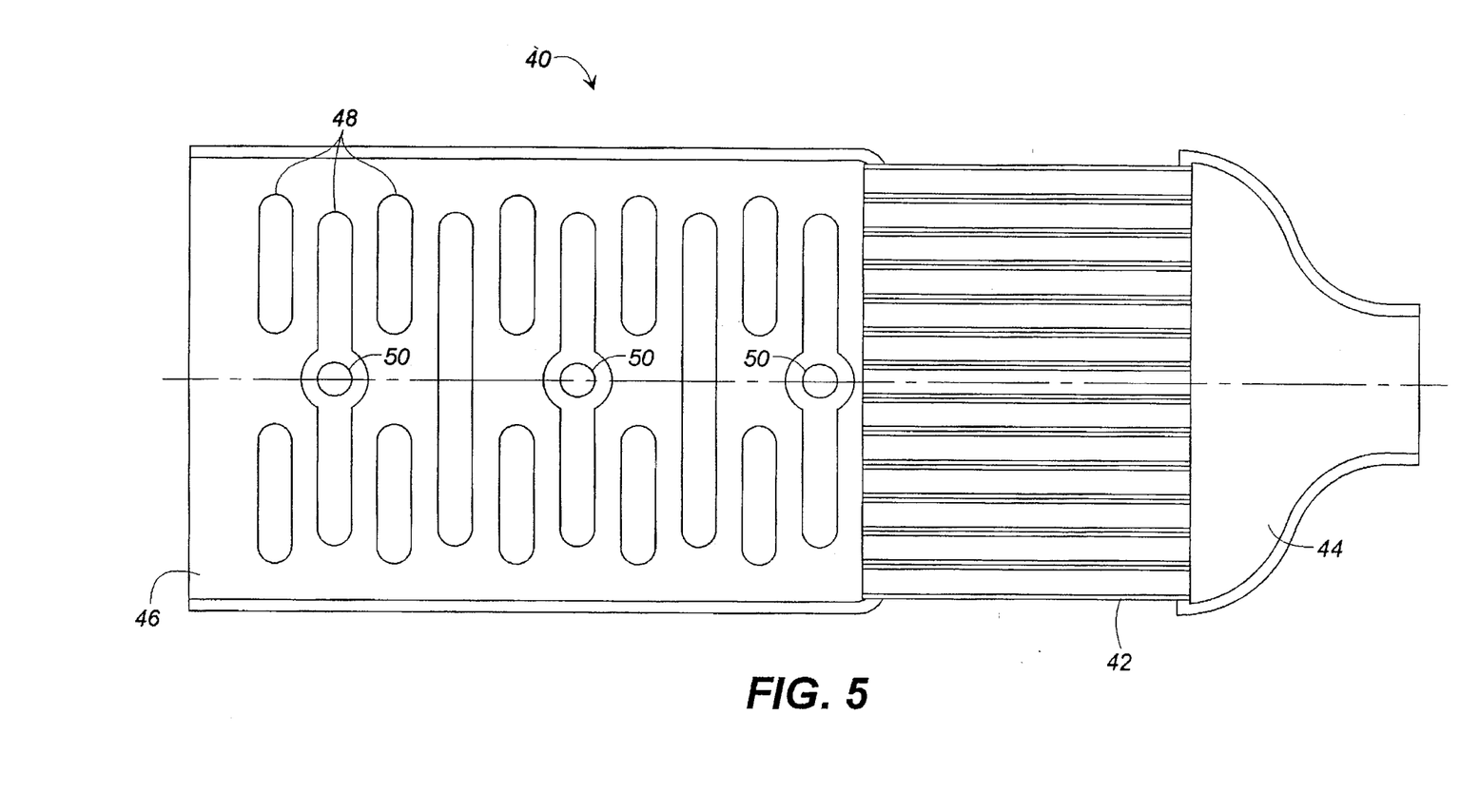
FIG. 5 is a top cross-sectional view of the condensing heat exchanger in FIG. 4.

A heat exchanger 40 according to a second embodiment of the invention, as shown in FIGS. 4 and 5, comprises a plurality of ceramic pipes 42 arranged linearly along the width of the heat exchanger 40. A sheet metal header 44 is attached to inlet ends of the ceramic tubes 42 and a polymer-based structure 46 is attached to outlet ends of the ceramic tubes 42.

The heat exchanger 40 may comprise a condensing heat exchanger 40 in a gas-fired hot air furnace with the heat exchanger 40 receiving combustion gas from a primary heat exchanger through the header 44. The temperature of the combustion gas is reduced by the geometry of the ceramic pipes 42 to below a softening temperature of the polymer-based structure 46. Consequently, the polymer-based structure 46 may be formed from a lower cost polymer.

The sheet metal header 44 is attached to the ceramic pipes 42 with an inlumescent ceramic fiber seal, such as Interam™. The ceramic pipes 42, in this example, have a 0.5 inch outer diameter and may comprise any suitable ceramic material, such as any of the materials forming the ceramic pipe 12. Similarly, the polymer-based structure 46 may comprise any suitable polymer, such as any of the ones forming the structure 16.

The polymer-based structure 46 is formed with a plurality of heat transfer enhancements 48 which extend completely through the polymer-based structure 46 and which direct the flow of the combustion gas through passages between the heat transfer enhancements 48. The heat transfer enhancements 48 also direct any condensates that may form within the heat exchanger 40 to a bottom portion of the heat exchanger 40. The polymer-based structure 46 has a set of mounting holes 50 for positioning the heat exchanger 40 relative to the primary heat exchanger within the furnace.

The foregoing description of the preferred embodiments of the invention has been presented for purposes of illustration and description. It is not intended to be exhaustive or to limit the invention to the precise forms disclosed. Many modifications and variations are possible in light of the above teaching.

For example, a heat exchanger according to the invention may be formed with any number of ceramic pipes for receiving a heated gas and for cooling the gas to below a softening temperature of a polymer-based structure attached to the ceramic pipe or pipes. Also, the polymer-based structure, as evident by the two embodiments, is not limited to any specific shape but may instead define any suitable flow path through the heat exchanger.

The embodiments were chosen and described in order to explain the principles of the invention and their practical application to thereby enable others skilled in the art to utilize the invention and various embodiments and with various modifications as are best suited to the particular use contemplated. It is intended that the scope of the invention be defined by the claims.

Wherefore, the following is claimed:

1. A heat exchanger for use in a gas-fired hot air furnace, comprising:

a ceramic pipe having a first end forming an inlet to the heat exchanger and a second end opposite the first end, said ceramic pipe forming an initial portion of a fluid flow path through said heat exchanger; and a polymer-based structure connected to said second end of said ceramic pipe and forming a remaining portion of said fluid flow path through said heat exchanger;

wherein said ceramic pipe has a length limited to that which is sufficient to cool a fluid flowing through said ceramic pipe from a first temperature at said fast end of said ceramic pipe of approximately 300°–400° F. to a second temperature at said second end of said ceramic pipe through a transfer of heat to a second fluid, said second temperature being lower than a softening temperature of said polymer-based structure.

2. A heat exchanger for use in a gas-fired hot air furnace, comprising:

a ceramic pipe having a fast end forming an inlet to the heat exchanger and a second end opposite the first end, said ceramic pipe forming an initial portion of a fluid flow path through said heat exchanger; and a polymer-based structure connected to said second end of said ceramic pipe and forming a remaining portion of said fluid flow path through said heat exchanger;

wherein said ceramic pipe has a length limited to that which is effective to cool a fluid flowing through said ceramic pipe from a first temperature at said first end of said ceramic pipe of approximately 300°–450° F. to a second temperature at said second end of said ceramic pipe through a transfer of heat to a second fluid, said second temperature being lower than a softening temperature of said polymer-based structure; and wherein said polymer-based structure supports said first end of said ceramic pipe and said heat exchanger further comprises an insulating material placed between said first end of said ceramic pipe and said polymer-based structure.

3. The heat exchanger as set forth in claim 2, wherein said polymer-based structure is for protecting said ceramic pipe from becoming damaged.

4. The heat exchanger as set forth in claim 2, wherein said insulating material comprises an inlumescent vermiculite containing material.

5. The heat exchanger as set forth in claim 1, wherein said polymer-based structure is molded around said second end of said ceramic pipe.

6. The heat exchanger as set forth in claim 1, wherein said ceramic pipe is formed from a material selected from a group comprised of aluminosilicate, magnesium silicate, magnesium aluminum silicate, siliconized silicon carbide, sintered silicon carbide, silicon, silicon nitride, cordierite, zirconium oxide, aluminum oxide, and mixtures of zirconium oxide with aluminum oxide.

7. The heat exchanger as set forth in claim 1, wherein said polymer-based structure is formed from a material selected from a group comprised of polypropylene, polyethylene, styrene, polyphenylene sulfide (PPS), liquid crystal polymers, polycarbonate, and polyphenylene oxide-based materials.

8. The heat exchanger as set forth in claim 1, further comprising at least a second ceramic pipe having a first end forming said inlet to said heat exchanger and a second end connected to said polymer-based structure.

9. The heat exchanger as set forth in claim 1, wherein said first end of said ceramic pipes are connected to a metallic header.

10. The heat exchanger as set forth in claim 1, wherein said polymer-based structure comprises a plurality of heat transfer enhancements for defining said fluid flow path.

11. The heat exchanger as set forth in claim 1, wherein said second fluid comprises room air passing over an exterior of said ceramic pipe and said polymer-based structure.

12. A method of forming a heat exchanger, comprising the steps of:

forming a ceramic pipe to have a certain length and to define an initial portion of a fluid flow path through said heat exchanger; and attaching said polymer-based structure to one end of said ceramic pipe with an opposite end of said ceramic pipe being an inlet to said heat exchanger;

wherein said step of forming said ceramic pipe comprises the step of forming said ceramic pipe to have a length limited to that which is effective to cool a fluid flowing through said ceramic pipe from a first temperature at said opposite end of said ceramic pipe of approximately 300°–450° F. to a second temperature at said one end of said ceramic pipe through a transfer of heat to a second fluid, said second temperature being lower than a softening temperature of said polymer-based structure.

13. The method as set forth in claim 12, wherein said step of forming said polymer-based structure occurs simultaneously with said step of attaching said polymer based structure to said ceramic pipe.

14. A method of forming a heat exchanger, comprising the steps of:

forming a ceramic pipe to have a certain length and to define an initial portion of a fluid flow path through said heat exchanger;

forming a polymer-based structure to define a remaining portion of said fluid flow path through said heat exchanger; and attaching said polymer-based structure to one end of said ceramic pipe with an opposite end of said ceramic pipe being an inlet to said heat exchanger;

wherein said step of forming said ceramic pipe comprises the step of forming said ceramic pipe to have a length limited to that which is effective to cool a fluid flowing through said ceramic pipe from a first temperature at said opposite end of said ceramic pipe of approximately 300°–450° F. to a second temperature at said one end of said ceramic pipe through a transfer of heat to a second fluid, said second temperature being lower than a softening temperature of said polymer-based structure;

said method further comprising a step of placing an insulating material between said opposite end of said ceramic pipe and said polymer-based structure.

15. The method as set forth in claim 12, wherein said step of forming said polymer-based structure comprises a step of injection molding said polymer-based structure.

16. The method as set forth in claim 12, wherein said step of forming said polymer-based structure comprises a step of blow molding such said polymer-based structure.

17. The method as set forth in claim 12, wherein said step of forming said polymer-based structure comprises a step of soluble-core molding said polymer-based structure.

18. The method as set forth in claim 12, wherein said step of attaching said ceramic pipe to said polymer-based structure comprises a step of placing an adhesive between said one end of said ceramic pipe and said polymer-based structure.

19. The method as set forth in claim 12, wherein said step of attaching said ceramic pipe to said polymer-based structure comprises a step of injection molding said polymer-based structure around said one end of said ceramic pipe.

20. The method as set forth in claim 12, further comprising a step of surrounding said opposite end of said ceramic pipe with a portion of said polymer-based structure.

21. A method of exchanging heat by using a heat exchanger, comprising the steps of:

passing a heated fluid through a ceramic pipe having a certain geometry, said ceramic pipe defining an initial portion of a fluid flow path through said heat exchanger;

routing said fluid from an outlet of said ceramic pipe to a polymer-based structure;

passing said fluid through said polymer-based structure, said polymer-based structure defining a remaining portion of said fluid flow path through said heat exchanger; and transferring heat conducted through said ceramic pipe to a second fluid; wherein aid step of passing said fluid through said ceramic pipe comprises the step of limiting a length of said ceramic pipe to that which is effective to cool said material from a first temperature at an inlet to said ceramic pipe of approximately 300°–450° F. to a second temperature at said outlet of said ceramic pipe, said second temperature being below a softening temperature of said polymer-based structure.

22. The method of claim 12, wherein said step of passing said fluid through said ceramic pipe comprises the step of passing said fluid through a plurality of ceramic pipes.

23. The method of claim 12, wherein said fluid flow path comprises a serpentine fluid flow path within said polymer-based structure and said step of passing said fluid through said polymer-based structure comprises the step of passing said fluid through said serpentine fluid flow path.

24. The method of claim 21, wherein said polymer-based structure comprises a plurality of heat transfer enhancements and said step of passing said fluid through said polymer-based structure comprises the step of directing said fluid through said heat exchanger with said heat transfer enhancements.

25. The method of claim 21, wherein said second fluid comprises room air and said step of transferring heat comprises the step of passing said room air over said ceramic pipe and said polymer-based structure.

* * * * *

UNITED STATES PATENT AND TRADEMARK OFFICE
CERTIFICATE OF CORRECTION

PATENT NO. : 5,623,988
DATED : April 29, 1997
INVENTOR(S) : Holowczak *et al.*

It is certified that error appears in the above-indentified patent and that said Letters Patent is hereby corrected as shown below:

In column 2, line 48 –"exchangers" is corrected to "exchanger".

In column 3, line 37 –"are" is corrected to "art".

In column 6, line 34 –'hoe" is corrected "hot".

In column 7, line 34 –"inlumescent" is corrected to "intumescent".

In column 8, line 17 –"fast is corrected to "first".

In column 8, line 18 –"400" is corrected to "450".

In column 8, line 25 –"fast is corrected to "first".

In column 8, line 50 –"inlumescent" is corrected to "intumescent".

In column 9, line 5 –"claim 1" is corrected to "claim 8".

UNITED STATES PATENT AND TRADEMARK OFFICE
CERTIFICATE OF CORRECTION

PATENT NO. : 5,623,988
DATED : April 29, 1997
INVENTOR(S) : Holowczak et al.

It is certified that error appears in the above-indentified patent and that said Letters Patent is hereby corrected as shown below:

In column 9, claim 12 – the word "and" at the end of line 18 is deleted; the following clause is inserted between lines 18 and 19: "forming a polymer-based structure to define a remaining portion of said fluid flow path through said heat exhcanger; and".

In column 10, line 34 – "aid' is corrected to "said".

In column 10, line 44 – "claim 12" is corrected to "claim 21".

In column 10, line 47 – "claim 12" is corrected to "claim 21".

Signed and Sealed this

Ninth Day of September, 1997

BRUCE LEHMAN

*Attest:*

*Attesting Officer*  Commissioner of Patents and Trademarks